United States Patent [19]

Story et al.

[11] 4,339,894

[45] Jul. 20, 1982

[54] CONVOLUTED SHIRRING WHEEL

[75] Inventors: Alfred D. Story; Dixon R. Asquith, both of Danville, Ill.

[73] Assignee: Teepak, Inc., Chicago, Ill.

[21] Appl. No.: 93,338

[22] Filed: Nov. 13, 1979

[51] Int. Cl.³ .......................... A22C 11/00; B24B 1/00
[52] U.S. Cl. ............................... 51/281 R; 51/95 LH; 51/95 TG; 17/42
[58] Field of Search .......... 17/42; 51/95 TG, 95 LH, 51/48 HE

[56] References Cited

U.S. PATENT DOCUMENTS 2,983,949  5/1961  Matecki ................................ 17/42
3,728,823  4/1973  Tomita et al. ................. 51/95 TG Primary Examiner—Willie G. Abercrombie
Attorney, Agent, or Firm—Charles E. Brown

[57] ABSTRACT

An apparatus for shirring synthetic casings wherein there is superimposed on the customary helical shirring pattern another pattern which will change the folding or shirring pleat pattern of the casing from that of the customary continuous helix so as to increase the compressibility of the casing. In its simplest form, the part cylindrical shirring surfaces of cooperating shirring wheels are machined so as cooperatively to define a cylindrical shirring surface having a center which rotates about the axis of an associated shirring mandrel.

19 Claims, 16 Drawing Figures

CONVOLUTED SHIRRING WHEEL

This invention relates in general to new and useful improvements in apparatus for shirring casings, and more specifically to a novel convoluted shirring wheel.

It is customary to shirr sausage casings and the like to reduce the length of the casings from many feet down to a few inches, whereby the casings may be readily handled and stored and yet readily available for extension when being stuffed. There are many patents relating to such casing apparatus. Among these is the U.S. patent to Arnold, U.S. Pat. No. 3,454,982, granted July 15, 1967, which clearly illustrates a conventional type of shirring wheel configuration wherein the casing is folded by applying shirring forces in a continuous helical line on the surface of the casing. The Arnold shirring wheels include a center having projecting from the periphery thereof a plurality of lugs or teeth with the lugs being helically disposed and each lug having an outermost casing engaging face having formed therein a part cylindrical shirring surface.

In accordance with the Arnold teaching and similar teachings, the inflated casing is fed over a shirring mandrel and is shirred by the application of force from the shirring wheel lugs. The combined part cylindrical shirring surfaces of the plural wheels of the head combine to define a substantially completely cylindrical surface which is disposed concentric with the mandrel. Although the Arnold device has proved to be successful in the desired collapsing of casings into accordion pleats and the compression of many feet of a casing into a few inches, attempts have been constantly made more tightly to compress the casing as it is shirred.

In the past, an effective method of compressing the casing has been by adding a further motion to the shirring wheels. Most specifically, the center of the cylindrical shirring surface defined by the plural shirring wheels has been caused to rotate about the center of the mandrel. However, this has been accomplished by mounting the entire shirring head for eccentric movement about the axis of the mandrel.

In accordance with this invention, it is proposed to obtain the net result of the rotation of the shirring surface of the shirring wheels about the axis of the mandrel while holding the shirring head stationary. This has been accomplished by so grinding the shirring surfaces on the lugs of the shirring wheels so that in cooperation the net effect is one wherein the cylindrical shirring surface does rotate about the axis of the mandrel while the shirring head is held stationary and the shirring wheels rotate about fixed axes.

Most specifically, the lugs of the shirring wheels are ground so as to have the shirring surfaces arranged in a convoluted relation so that at least once during each revolution of a shirring wheel there is a complete shift of the shirring surface from one side portion of the shirring wheel to the opposite side and back again. The shifting of the shirring surfaces of adjacent wheels are out of phase in accordance with the number of shirring wheels of the shirring head so that there is a constant cooperation of the shirring surfaces.

If desired, several convolutions of the shirring surfaces may be effected for each revolution of the shirring wheel.

In addition to the shirring surfaces shifting back and forth on the lugs, the contours of the shirring surfaces are constantly varied so as to vary the circumferential extent of each part cylindrical shirring surface of a lug in phase with the convolutions of the shirring surfaces.

Although the specific convoluted shirring surfaces may be ground in the lugs of a shirring wheel in any desired manner, it has been found that when a single convolution is desired, a conventional hub may be provided wherein the shaft receiving bore thereof is both radially offset with respect to the axis of the mounting surface for receiving the shirring wheel and longitudinally tilted. The combined tilting and radial offsetting provide for the necessary convolution of the shirring surfaces of the lugs when a conventional shirring wheel blank of the type used in accordance with the Arnold patent is mounted on the special hub. After the grinding of the shirring wheel has been completed, in use it is mounted on a conventional hub wherein the axis of the shaft bore is common with the axis of the mounting surface for the shirring wheel.

With the above and other objects in view that will hereinafter appear, the nature of the invention will be more clearly understood by reference to the following detailed description, the appended claims, and the several views illustrated in the accompanying drawings.

IN THE DRAWINGS

Figure 1:
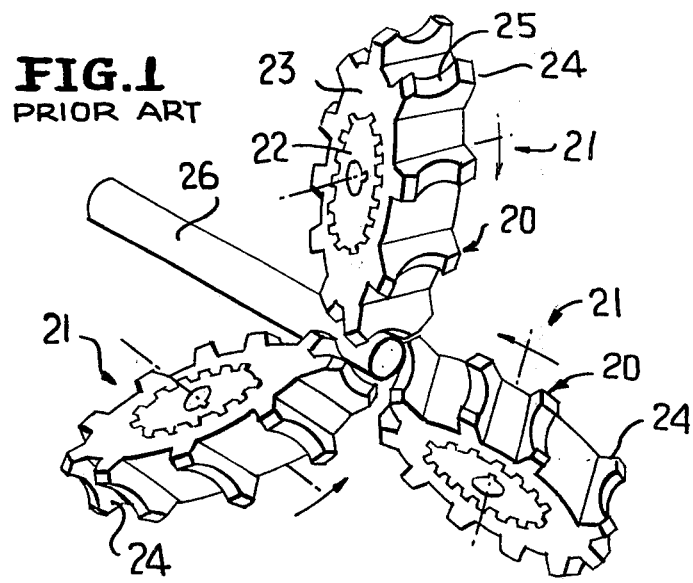
FIG. 1 is a schematic perspective view showing three shirring wheels mounted with respect to a hollow shirring mandrel in accordance with the teaching of the Arnold patent.

Referring now to the drawings in detail, reference is first made to FIG. 1 wherein there is illustrated a typical arrangement of shirring casings for sausages and the like formed of artificial materials. The shirring apparatus includes at least two shirring wheels 20, three wheels being illustrated, carried by a fixed support (not shown). Each shirring wheel 20 is mounted for rotation about a fixed axis 21.

Each shirring wheel 20 is mounted on a hub 22 for rotation and includes a center 23 having a plurality of lugs or teeth 24 projecting radially therefrom in circumferentially spaced relation. The lugs 24 are arranged helically on the center 23 and have machined therein part cylindrical shirring surfaces 25.

Figure 2:
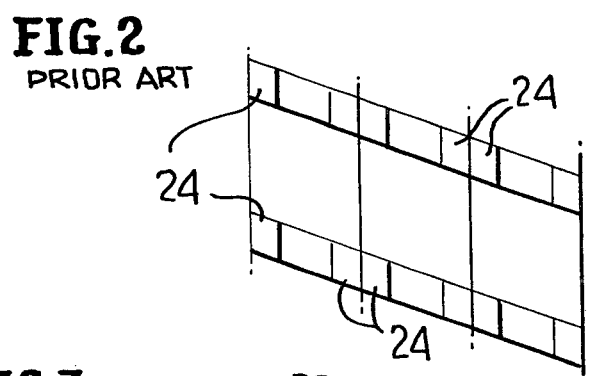
FIG. 2 is a partial development of the shirring wheels of FIG. 1.

With reference to FIG. 2, it will be seen that the lugs 24 of adjacent shirring wheels are displaced relative to one another so as to define a continuous helical path as the shirring wheels rotate in unison.

The shirring wheels 20 cooperate in a conventional manner with a hollow shirring mandrel 26 over which the casing to be shirred is fed. Compressed air is introduced into the casing through the hollow mandrel 26 so that the casing is inflated at the time it is engaged by the lugs 24 and can be readily radially inwardly folded in a generally helical pattern so as to reduce materially the length of the casing.

Figure 3:
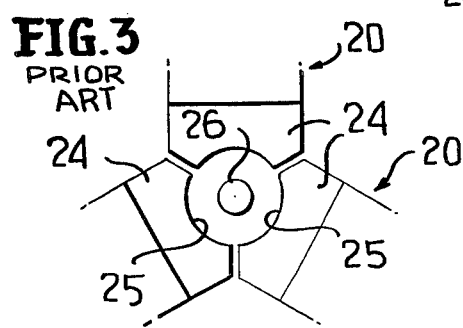
FIG. 3 is a schematic end view showing the arrangement of shirring wheels and a fixed mandrel wherein the shirring head is also fixed.

Referring now to FIG. 3, it will be seen that there is illustrated schematically an end view of the mandrel 26 and the wheels 20 of FIG. 1. It will be seen that the lugs 24 are identical and each lug 24 has formed therein the part cylindrical shirring surface 25 which has a circumferential extent approaching 120°.

Figure 4:
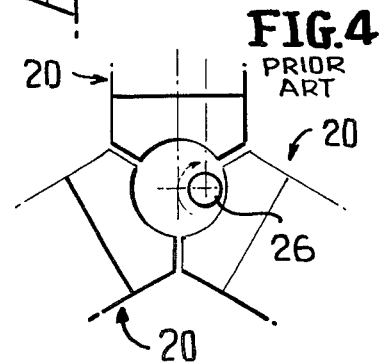
FIG. 4 is a view similar to FIG. 3, and shows a modified prior art arrangement wherein the shirring head oscillates about the axis of the shirring mandrel.

Referring now to FIG. 4, it will be seen that there is illustrated a modification of the Arnold arrangement. Most specifically, while the shirring wheels 20 may be of the same construction as that of the Arnold patent and each shirring wheel is mounted for rotation about an axis, the spindles or other support means defining the axis of rotation of the shirring wheels 20 are mounted by a support (not shown) which is mounted for oscillatory movement about the axis of the shirring mandrel 26. In this manner, in addition to the engagement of the lugs with the casing causing a shirred pleat pattern to form a continuous helix, a further pattern is superimposed on the casing so as to permit a tighter shirring or folding.

It is both undesirable to have the head oscillate under certain conditions and further, in order to have the head oscillate, it is necessary to reconstruct existing shirring machines. It has been found, however, in accordance with this invention that if the shirring surfaces 25 are formed in the lugs 24 in a specified pattern, the same advantages obtained with the oscillating head arrangement of FIG. 4 can be obtained while the shirring wheels may be carried by a fixed head and rotate about fixed axes. Thus, the modified shirring wheels in accordance with this invention may be mounted on the apparatus of the Arnold patent and produce the results of the oscillating shirring head arrangement of FIG. 4.

Figure 5:
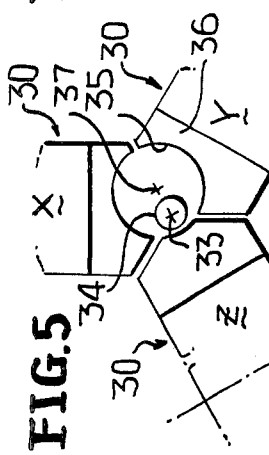
FIG. 5 is a schematic view similar to FIG. 3, and shows the shirring wheel and mandrel arrangement of this invention.
Figure 7:
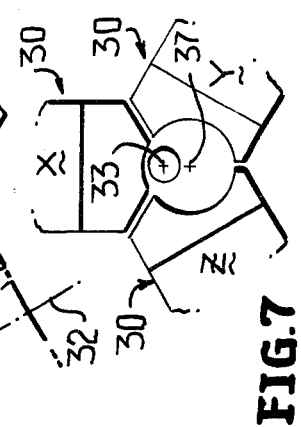
Figure 9:
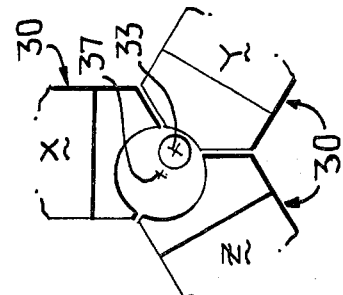
Figure 12:
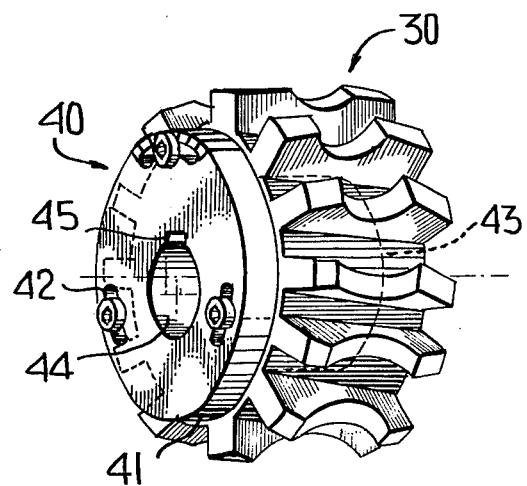
FIG. 12 is a perspective view of one shirring wheel in accordance with this invention.

Referring now to FIG. 5, it will be seen that there are illustrated modified forms of shirring wheels, generally identified by the numeral 30, with there being x, y and z wheels. Each shirring wheel 30 is mounted for rotation about a fixed axis 32. These axes are disposed at a uniform distance from a fixed axis 33 of a fixed shirring mandrel 34. Further, the central plane of the shirring wheels 30 have disposed therein the shirring mandrel axis 33. However, as is clearly shown in FIGS. 5–10, as the shirring wheels 30 rotate, part cylindrical shirring surfaces 35 formed in the lugs or teeth 36 thereof shift from one side of the wheel to the other and back again and at the same time the depth of the part cylindrical shirring surface 35 and the circumferential extent thereof vary. This is due to the rotation of the center 37 of the shirring surfaces about the mandrel axis 33 as is evident from FIGS. 5–10. It will be seen that when the shirring surface 35 is of either a maximum depth or a minimum depth, the center of the cylindrical shirring surface lies in the central plane of that shirring wheel and the shirring surfaces 35 shift from one side of the lug toward the other and return and decrease and then increase in depth and circumferential extent.

Figure 11:
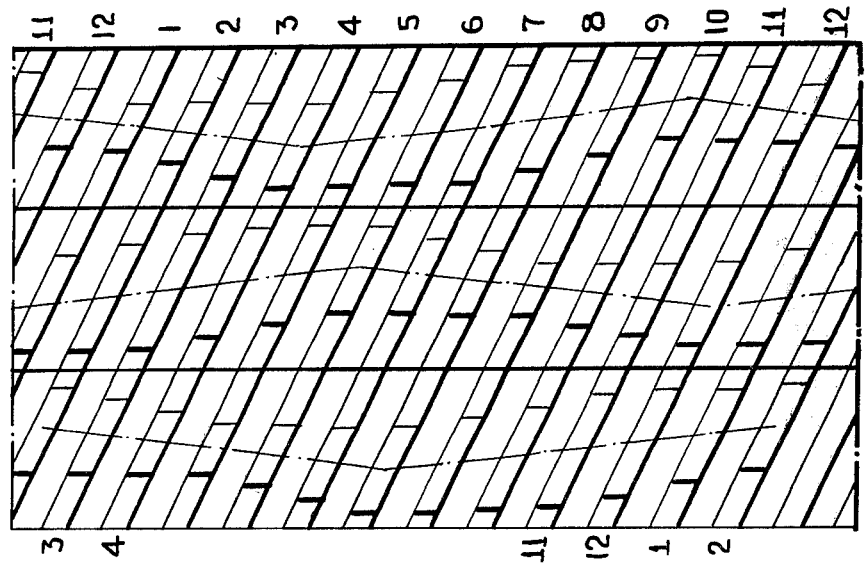
FIG. 11 is a partial development of the shirring wheels in accordance with this invention.
Figure 6:
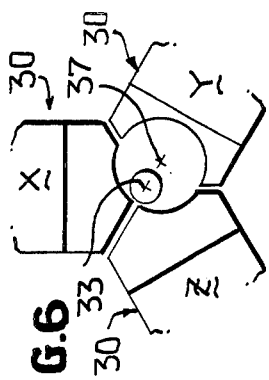
FIGS. 6–10 are other views similar to FIG. 5, and show other relative arrangements of the shirring wheels with the shirring surfaces thereof rotated 60° each time about the axis of the shirring mandrel.
Figure 8:
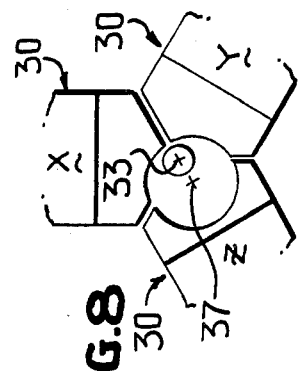
Figure 10:
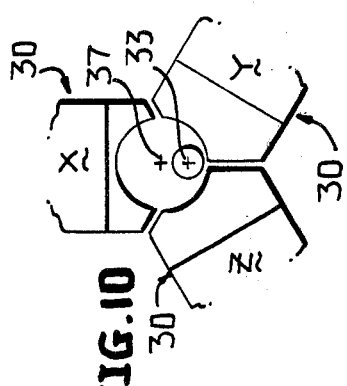

FIG. 11 is a partial development of the lugs 36 of the shirring wheels 30 and corresponds generally to the partial development of FIG. 2. The shirring wheels 30 each have twelve lugs and in FIG. 11 the x, y and z wheels lugs are arranged in columns and the numbered lugs are arranged in sloping rows. Row 1 corresponds to the lug arrangement of FIG. 5; row 3 to FIG. 6; row 5 to FIG. 7; row 7 to FIG. 8; row 9 to FIG. 9; and row 11 to FIG. 10.

It is to be understood from FIG. 11 in particular that the convoluted arrangements of the shirring surfaces on the lugs of the adjacent wheels are out of phase by an angle equal to 360° divided by the number of wheels. Thus, when the wheels are three in number, the zero point on one wheel will be advanced 120° ahead of the zero point on the preceding wheel.

It has been found that when there is a single convolution of the shirring surfaces 35 for each revolution of the shirring wheel, as compared to the same general type of shirring wheels but without the convoluted arrangement of the shirring surfaces, fifty-five or sixty-six feet of a casing may be shirred on a stick, whereas with the convoluted arrangement of the shirring surfaces in accordance with this invention eighty-two feet of the same casing may be shirred on the same stick.

It is to be understood that the shirring surfaces 35 may be machined on the lugs 36 in various manners. Generally the shirring surfaces are machined by way of a grinding operation, and it is feasible to provide a grinding head of an arrangement wherein there is a relative movement between the lugs and the grinding wheel both radially and axially to accomplish the convoluted relationship of the shirring surfaces 35. With there being a timed relationship between the axial and radial shifting as opposed to the rotation of the shirring wheel, two or more shirring surfaces arranged in two or more convolutions per rotation of the shirring wheel may be formed.

Figure 13:
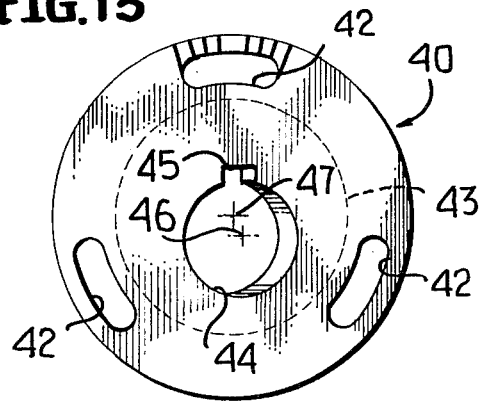
FIG. 13 is an end view of a shirring wheel hub used for grinding the shirring wheel of this invention.
Figure 15:
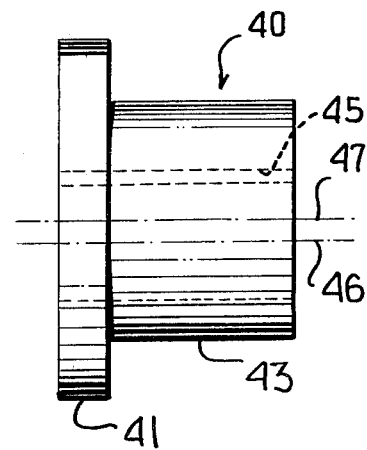
FIG. 15 is a side elevational view of the hub of FIG. 13, and shows the radial offset of the axis of the shaft bore with respect to the axis of the mounting surface.
Figure 14:
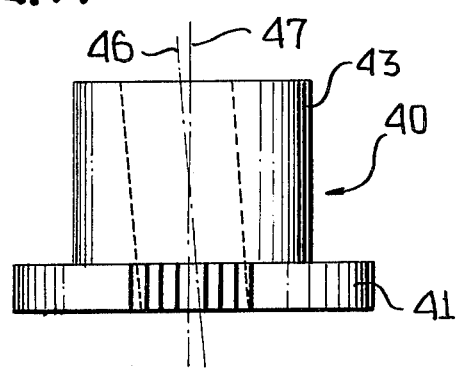
FIG. 14 is a top plan view of the shirring wheel of FIG. 13, and shows the tilting of the shaft receiving bore of the hub relative to the axis of the wheel receiving surface of the hub.

It has been found that conventional shirring wheel grinding apparatus may be readily utilized in the forming of the shirring wheels 30. With reference to FIGS. 13, 14 and 15, a conventional hub 40 may be provided. The hub 40 conventionally includes a mounting flange 41 having slots 42 of an arcuate extent formed therein for receiving fasteners which are threaded into the shirring wheel center. The hub 40 also has adjacent the flange 41 a cylindrical mounting surface 43 of a size to be snugly received within a large bore in the shirring wheel center. A shirring wheel blank is mounted on the hub 40 by sliding over the mounting surface 43 and is then fixedly secured thereto by fasteners passing through the slots 42. By elongating the slots 42 and providing on the flange 41 indicia 43, the lugs of the shirring wheels may be properly oriented so as to be in the proper phase with respect to the hub.

Each hub 40 is also provided with a shaft bore 44 and a keyway 45 for the mounting of the hub on a shaft in a preselected rotational orientation. Thus the slots 42 permit the orientation of the shirring wheels relative to the keyway 45.

In accordance with this invention, the bore 44 has an axis 46 which, as is shown in FIGS. 13 and 15, is radially offset from the axis 47 of the mounting surface 43 and in plan tilted or angled with respect thereto as is shown in FIG. 13. It is also to be noted that in plan the bore axis 46 intersects the mounting surface axis 47 at midlength of the mounting surface 43.

Using the hub 40, shirring wheel blanks of the type provided for in accordance with the Arnold patent may be ground so as to superimpose a further pattern on the casing being shirred, with there being one convolution of this superimposed pattern per shirring wheel revolution. Simply illustrated, the shirring wheel grinding apparatus includes a support shaft 50 on which a hub 40 carrying a shirring wheel 30 is mounted for rotation with the shaft 50. The shaft 50 is rotated by means of a motor 51 coupled to the shaft 50 by a drive train 52.

The shirring surfaces 35 are ground in the lugs 36 utilizing a grinding wheel 53 having a configurated grinding surface 54 in accordance with the cylindrical shirring surfaces. The grinding wheel 54 may be simply carried by a shaft 55 of another motor 56.

Figure 16:
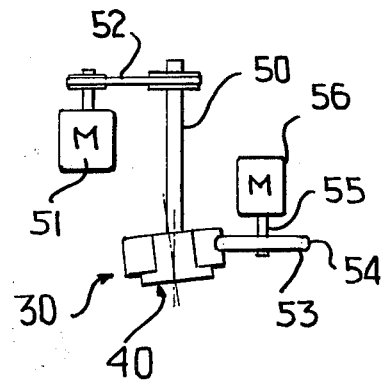
FIG. 16 is a schematic view showing an apparatus incorporating the hub of FIG. 12 for the grinding of shirring wheels in accordance with this invention.

As described above, after a shirring wheel has been ground while mounted on the hub 40 in the manner shown in FIG. 16, it may be mounted on a similarly constructed hub 60 wherein the mounting surface 61 of the hub has an axis common with the axis of a shaft bore 62 of that hub. The net result is that the shirring surfaces 35 will superimpose a convoluted pattern on the shirred casing with there being one convolution for each rotation of the shirring wheel.

Although only a preferred embodiment of the shirring wheel in accordance with this invention and the manner in which it is formed has been illustrated and described herein, it is to be understood that minor variations may be made in the shirring wheel and the method of forming the same without departing from the spirit and scope of the invention as defined by the appended claims.

We claim:

1. A shirring wheel comprising a circular center having projecting from the periphery thereof a plurality of circumferentially spaced lugs, said lugs being helically disposed, each lug having an outermost casing engaging face having formed therein a part cylindrical shirring surface, and said part cylindrical shirring surfaces being arranged in a convoluted pattern, the combination of said helically disposed lugs and said convoluted pattern of said part cylindrical shirring surfaces providing for a continuous helical shirring pattern having superimposed thereon an oscillating pattern.

2. A shirring wheel according to claim 1 wherein said shirring wheel has parallel side faces, and said part cylindrical shirring surface in adjacent lugs gradually moving from adjacent to one of said side faces, then to adjacent the other of said side faces and return.

3. A shirring wheel according to claim 2 wherein said part cylindrical shirring surfaces are arranged in a unit convolution pattern about said center.

4. A shirring wheel according to claim 1 together with means for mounting said center for rotation about a fixed axis.

5. A shirring wheel according to claim 1 wherein the circumferential extents of said part cylindrical shirring surfaces constantly change from one lug to the next lug in accordance with said convoluted pattern.

6. A shirring head comprising a plurality of shirring wheels, each shirring wheel lying in a separate general plane and being mounted for rotation in that plane, each shirring wheel including a circular center having projecting from the periphery thereof a plurality of circumferentially spaced lugs, said lugs being helically disposed, each lug having an outermost casing engaging face having formed therein a part cylindrical shirring surface, and said part cylindrical shirring surfaces being arranged in a convoluted pattern, the combination of said helically disposed lugs and said convoluted pattern of said part cylindrical shirring surfaces providing for a continuous helical shirring pattern having superimposed thereon an oscillating pattern.

7. A shirring head according to claim 5 wherein said lugs are phased to engage a casing in a continuous helical pattern.

8. A shirring head according to claim 6 wherein said lugs are phased to engage a casing in a continuous helical pattern, and said part cylindrical shirring surface advancing and retarding around said wheels.

9. A shirring head according to claim 8 wherein the circumferential extents of said part cylindrical shirring surfaces constantly change in each shirring wheel from one lug to the next lug.

10. A shirring head according to claim 6 together with a mandrel having a fixed axis lying in the plane of each said wheel, and said part cylindrical shirring surfaces having an axis which progresses about said mandrel axis parallel thereto as said shirring wheels rotate.

11. A shirring head according to claim 6 together with a mandrel having a fixed axis lying in the plane of each said wheel, and said part cylindrical shirring surfaces having an axis which progresses about said mandrel axis parallel thereto as said shirring wheels rotate and said shirring surface axis making a whole unit rotation about said mandrel axis during each full revolution of said shirring wheels.

12. A shirring head according to claim 6 together with a mandrel having a fixed axis lying in the plane of each said wheel, and said part cylindrical shirring surfaces having an axis which progresses about said mandrel axis parallel thereto as said shirring wheels rotate, the circumferential extents of said part cylindrical shirring surfaces constantly change in each shirring wheel from one lug to the next lug.

13. A shirring head according to claim 11 wherein said rotational path of said shirring surface axis is circular with said mandrel axis as a center.

14. A shirring head according to claim 10 wherein said shirring wheels are equally spaced about said mandrel, and the convoluted patterns of adjacent ones of said shirring wheels being out of phase by an angle equal to 360° divided by the number of shirring wheels.

15. A method of forming a shirring wheel, said method comprising the steps of providing a wheel blank having a plurality of circumferentially spaced radially projecting lugs and a hub receiving bore, providing a special hub having a wheel mounting surface concentric about a first axis and a shaft receiving bore having an axis tilted relative to said first axis, mounting said wheel blank on said hub, and machining shirring surfaces on said lugs in a customary manner.

16. The method of claim 15 wherein said tilted axis intersects said first axis at midlength of said wheel mounting surface.

17. The method of claim 15 wherein said machined wheel is removed from said special hub and placed on a like hub having a common first axis and bore axis.

18. The method of claim 15 wherein said tilted axis is radially offset from said first axis when viewed 90° from the direction of viewing the tilt of said tilt axis relative to said first axis.

19. The method of claim 15 wherein the lugs are helically disposed wherein there is a combination of helical lugs and convoluted shirring surface on the helical lugs to provide for a continuous helical shirring pattern having superimposed thereon an oscillating pattern.

* * * * *